(12) United States Patent
Sperber et al.

(10) Patent No.: US 12,117,047 B2
(45) Date of Patent: Oct. 15, 2024

(54) HYDRAULIC ASSEMBLY, HYDRAULICALLY ACTUATED CONSUMER WITH SUCH A HYDRAULIC ASSEMBLY, AND METHOD FOR HYDRAULIC ACTUATION OF A CONSUMER

(71) Applicant: FTE AUTOMOTIVE GmbH, Ebern (DE)

(72) Inventors: Christian Sperber, Ebern (DE); Benjamin Wüchner, Ebern (DE); Patrick Gegner, Ebern (DE)

(73) Assignee: FTE AUTOMOTIVE GmbH, Ebern (DE)

( * ) Notice: Subject to any disclaimer, the term of this patent is extended or adjusted under 35 U.S.C. 154(b) by 73 days.

(21) Appl. No.: 17/820,583

(22) Filed: Aug. 18, 2022

(65) Prior Publication Data
US 2023/0088401 A1  Mar. 23, 2023

(30) Foreign Application Priority Data
Sep. 20, 2021 (DE) .................. 10 2021 124 209.6

(51) Int. Cl.
*F16D 48/02* (2006.01)
*F16D 25/06* (2006.01)
(Continued)

(52) U.S. Cl.
CPC ............ *F16D 25/14* (2013.01); *F16D 25/06* (2013.01); *F16D 48/02* (2013.01);
(Continued)

(58) Field of Classification Search
CPC ............ F16D 48/02; F16D 2048/0221; F16D 2048/0233; F16D 2048/0245;
(Continued)

(56) References Cited

U.S. PATENT DOCUMENTS 5,275,268 A * 1/1994 Masuda .................. F16D 47/04
192/48.92
5,687,824 A * 11/1997 Hara ..................... F16D 25/082
192/58.41
(Continued)

FOREIGN PATENT DOCUMENTS

DE  10 2011 100 845 A1  11/2012
EP          1795391 A1 *  6/2007  ......... B60K 23/0808

OTHER PUBLICATIONS

German Search Report issued Jun. 9, 2022 in German Application 10 2021 124 209.6 filed on Sep. 20, 2021, citing documents 1-2 & 15 therein, 6 pages (with English Translation of Categories of Cited Documents & Written Opinion).
(Continued)

*Primary Examiner* — Richard M Lorence
(74) *Attorney, Agent, or Firm* — Oblon, McClelland, Maier & Neustadt, L.L.P.

(57) ABSTRACT

A hydraulic assembly with a lubricant output, a control output and a pump which can supply a hydraulic fluid flow to the lubricant output and the control output. A switching valve with structurally predefined hysteresis is arranged between a pump output and the control output of the hydraulic assembly. Depending on the pressure in the branch between the pump output and the control output, the valve can be switched between an open position in which the control output is connected to the pump output, and a blocking position in which the control output is blocked off. The switching valve switches from the open position to the blocking position when the pressure provided by the pump exceeds an upper switching threshold, and returns from the blocking position to the open position when the pressure provided by the pump falls below a lower switching thresh-
(Continued)

old. A clutch can be switched by means of such a hydraulic assembly, and a method for actuating the clutch.

20 Claims, 4 Drawing Sheets

(51) Int. Cl.
*F16H 57/04* (2010.01)
*F16H 61/00* (2006.01)

(52) U.S. Cl.
CPC . *F16H 57/0435* (2013.01); *F16D 2048/0221* (2013.01); *F16D 2048/0245* (2013.01); *F16H 2061/0037* (2013.01)

(58) Field of Classification Search
CPC ..... F16D 2048/0248; F16D 2048/0263; F16D 2048/0275; F16D 2048/0287; F16D 2048/029; F16D 2048/0296; F16D 25/14; F16D 2025/081; F16D 25/082; F16D 25/083; F16D 25/087; F16H 57/0436; F16H 61/0025; F16H 2061/0037; F15B 13/022; F15B 13/042; F15B 2211/4053; F15B 2211/428

See application file for complete search history.

(56) References Cited

U.S. PATENT DOCUMENTS

| | | |
|---|---|---|
| 7,059,460 B2 | 6/2006 | Duan et al. |
| 2010/0206672 A1 | 8/2010 | Pinturi et al. |
| 2014/0064990 A1 | 3/2014 | Jo et al. |
| 2015/0167837 A1 | 6/2015 | Lee et al. |

OTHER PUBLICATIONS

Extended European Search Report issued on Feb. 13, 2023 in European Patent Application No. 22194283.2, citing documents 1-2 therein, 7 pages.

* cited by examiner

HYDRAULIC ASSEMBLY, HYDRAULICALLY ACTUATED CONSUMER WITH SUCH A HYDRAULIC ASSEMBLY, AND METHOD FOR HYDRAULIC ACTUATION OF A CONSUMER

BACKGROUND OF THE INVENTION

Field of the Invention

The invention concerns a hydraulic assembly, a hydraulically actuated consumer with such a hydraulic assembly, and a method for hydraulic actuation of a consumer.

Description of the Related Art

The hydraulic assembly may, in particular, be used in (partially) electrically driven vehicles in order to switch a clutch when required. For example, when switching from a first to a second gear or vice versa. It is also conceivable that an electric motor is switched on or off by actuation of the clutch. Other application examples are hydraulically actuated consumers in the vehicle which generate a counter-pressure.

In addition, the hydraulic assembly may be used to provide a current/lubricant flow, for example to a transmission assigned to the clutch, or an electric motor, battery, heat exchanger, components of power electronics etc. for this clutch or another clutch.

In principle, in motor vehicles, it is desirable that the hydraulic assembly requires as little energy as possible. This applies to an even greater extent in electric vehicles, since the energy consumption of ancillaries reduces the maximum range.

BRIEF SUMMARY OF THE INVENTION

The object of the invention is to create a hydraulic assembly with which, with minimum energy consumption and low structural complexity, firstly a coolant/lubricant flow can be provided, and secondly a clutch can be operated as required (and preferably permanently operated and held energy-savingly in the present state).

To achieve this object, according to the invention, a hydraulic assembly is provided with a lubricant output, a control output and a pump which can supply a hydraulic fluid flow to the lubricant output and the control output, wherein a switching valve with structurally predefined hysteresis is arranged between a pump output and the control output of the hydraulic assembly and, depending on the pressure in the branch between the pump output and the control output, can be switched between an open position in which the control output is connected to the pump output, and a blocking position in which the control output is blocked off, wherein the switching valve switches from the open position to the blocking position when the pressure provided by the pump exceeds an upper switching threshold, and returns from the blocking position to the open position when the pressure provided by the pump falls below a lower switching threshold.

Also, to achieve this object, a clutch is provided having such a hydraulic assembly, a clutch actuator which is coupled to the control output of the hydraulic assembly, and a reset device which loads the clutch into one position and counteracts the clutch actuator.

Finally, to achieve this object, a method for switching such a clutch is provided, wherein the clutch actuator is supplied with hydraulic fluid via the control output in order to switch the consumer from one state into another, wherein the switching valve is loaded into the open position by a reset means, wherein the pump is operated with a starting rotation speed at which the pressure lies below the upper switching threshold, and the conveyed hydraulic fluid is output via the lubricant output; wherein the rotation speed of the pump is increased if the clutch is to be switched, so that firstly the clutch actuator is supplied with hydraulic fluid and, as soon as the clutch actuator has been operated, the hydraulic fluid builds up in the branch of the control output until the upper switching threshold is exceeded, whereby the switching valve is brought into the blocking state; wherein then the pump is slowed again to the starting rotation speed and the switching valve remains in the blocking state because of the structurally predefined hysteresis; wherein finally, when the clutch is to be switched back, the rotation speed of the pump is lowered or reversed so that it falls below the lower switching threshold and the switching valve returns to the open position.

Using the hydraulic assembly, the clutch can be switched and then the switching valve brought into the blocking position so that the clutch remains in its switched state (for example, a closed state). For this, no actively externally actuated valves are required, but the clutch can be switched and locked in a switched state purely by a change of the pressure provided by the pump. The basic concept of the invention is to equip the switching valve with a structurally predefined hysteresis. The term "structurally predefined hysteresis" in this context means that the switching valve is structurally designed such that a comparatively high pressure (above the upper switching threshold) is necessary to move it from the open position to the blocking position, and that the applied pressure must first fall significantly (namely, below the lower switching threshold) before the switching valve returns to the open position. The structurally predefined hysteresis is based on structural features, for example different cross-sectional ratios, and is thereby delimited from an unavoidable hysteresis which is substantially attributable to friction.

According to one embodiment of the invention, the lower switching threshold is smaller than the upper switching threshold by at least a factor of 2. The gap between the upper and lower switching thresholds may even be selected larger. For example, the upper and lower switching thresholds may differ from one another by a factor of 3. In absolute values, for applications in the automotive sector, a gap of the order of 10 to 15 bar between the lower and upper switching thresholds has proved advantageous.

This gap between the upper and lower switching thresholds allows the pump to run in a "normal state", i.e. when it need merely provide a coolant/lubricant flow, with a starting rotation speed, for example of the order of 1000 rpm, and only briefly increase the pump rotation speed, for example to 3000 rpm, when a switching process is triggered. The pump rotation speed may then be lowered again to the starting speed immediately afterwards. Thus in normal operation, comparatively little drive power for the pump is required. When the switching valve is to be returned from the blocking position to the open position, it is sufficient to briefly reduce the rotation speed of the pump again so that the pressure in the branch between the pump output and the control connection falls again. Thus it is possible to open the clutch within a time period of 0.4 to 0.8 seconds after the time at which the pump rotation speed was reduced. If an even quicker response is desired, the pump rotation direction may briefly be reversed so that a negative pressure is produced. In this way, even shorter switching times may be achieved. These may be of the order of 0.2 to 0.5 seconds.

According to an embodiment of the invention, the switching valve has an actuating piston which is exposed to the pressure in the branch between the pump output and the control output. By means of an actuating piston, with little structural complexity, the pressure on the delivery side of the pump may be used to switch the switching valve between the open position and the blocking position.

According to a preferred embodiment, the actuating piston is arranged in a cylinder having a pressure connection, which is connected to the branch between the pump output and the control output, wherein a working end face of the actuating piston rests on the pressure connection and closes this when the switching valve is in the open position, wherein the cross-sectional area of the pressure connection is smaller than the area of the working end face. When the switching valve in the open position, only the small part of the working end face of the actuating piston is exposed to the pressure at the pressure connection and hence to the pressure in the branch between the pump output and the control output, so that a comparatively high pressure is required to move the actuating piston, for example against the effect of a spring which loads the switching valve into the open position. However, as soon as the working end face of the actuating piston lifts away from the pressure connection, the entire working end face of the actuating piston is loaded with the pressure of the pressure connection (and hence the pressure in the branch between the pump output and the control output). Accordingly, a very high force acts on the actuating piston. Because of this high force, firstly, the actuating piston switches the switching valve into the blocking position very quickly. Secondly, the pressure acting on the working end face must fall very far before the force generated by the actuating piston falls sufficiently far for the switching valve to be able to move back into the open position. By means of the different cross-sections of the pressure connection on one side and the working end face on the other, the structurally predefined hysteresis can be set in the desired fashion with very simple means.

A bypass channel may be provided which connects the pump output to the control output, bypassing the switching valve, wherein a check valve is provided in the bypass channel which blocks a return flow from the control output to the pump output. This allows further hydraulic fluid to be delivered to the control output even when the switching valve is in the blocking position.

Preferably, a choke is arranged between the pump output and the lubricant output so that a specific build-up pressure is created when the pump rotation speed is increased.

The pump may in particular be designed with single flow so that it can be produced economically.

To drive the pump, a conventional electric motor may be used so that if required, the rotation direction of the pump can be adapted in the desired fashion or even reversed with little control complexity.

The pressure at which the clutch actuator is switched against the effect of the reset device lies below the upper switching threshold, so that first the clutch is closed before the switching valve switches into the blocking position.

The clutch may have a so-called central release device, also known as a CSC (concentric slave cylinder). This is hydraulically sealed so that the clutch remains in the switched position when the switching valve has been brought into the blocking position.

BRIEF DESCRIPTION OF THE SEVERAL VIEWS OF THE DRAWINGS

The invention will be described below on the basis of an embodiment which is illustrated in the appended drawings. In the drawings.

DETAILED DESCRIPTION OF THE INVENTION

Figure 1:
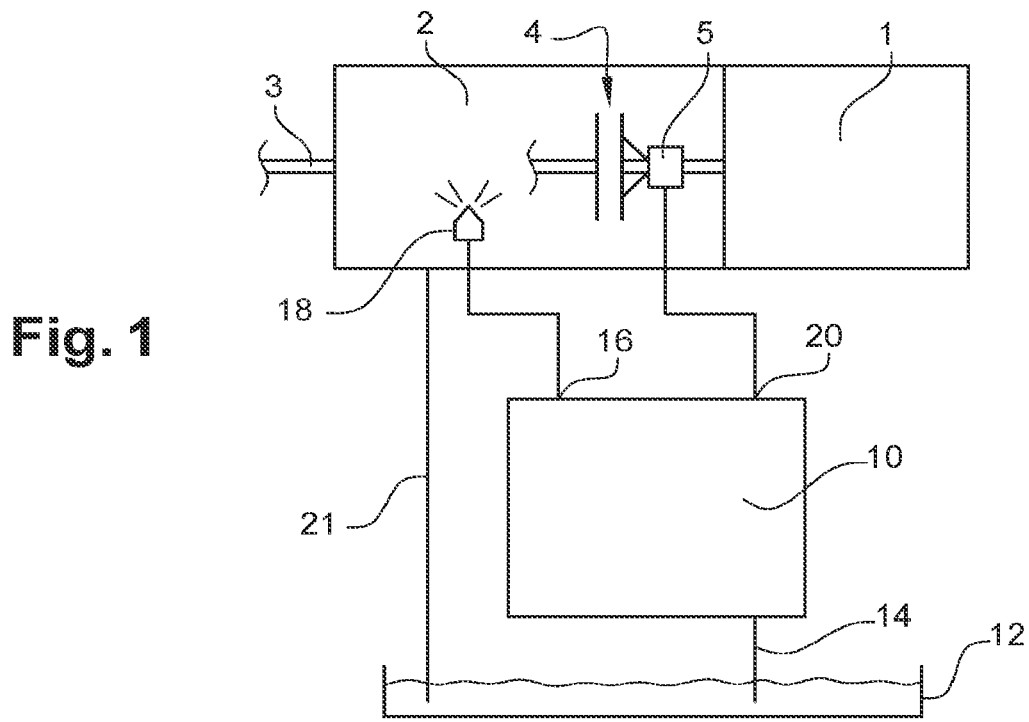
FIG. 1 shows schematically a clutch according to the invention with a hydraulic assembly according to the invention in a first embodiment.

FIG. 1 shows schematically an electric motor 1 which is coupled to a transmission 2, also shown merely schematically. The transmission 2 serves to translate the rotation speed of the electric motor in a desired fashion. For this, the transmission has two or more gears. The input power of the electric motor 1 is output from the transmission 2 via an output shaft 3.

In order to switch between the different translation stages, a clutch 4 is provided. A clutch actuator 5 is assigned to the clutch 4 and can switch the clutch between an open and a closed position (or vice versa).

The precise structure of the transmission 2 and the clutch 4 is not relevant here. The only important factor is that the clutch actuator 5 is able to move the clutch against the action of a reset device. If the reset device loads the clutch 4 into an open position, the clutch 4 can be closed by operation of the clutch actuator 5, and vice versa.

The clutch may be a friction clutch or a claw clutch.

The clutch actuator 5 may in particular be a so-called central release device, also known as a CSC (concentric slave cylinder).

A hydraulic assembly 10, which can draw in hydraulic fluid from a storage reservoir 12 through an intake line 14, is assigned to the transmission 2 and the clutch 4, or more precisely, the clutch actuator 5 of the clutch 4.

Although the hydraulic assembly 10 is here assigned to the clutch actuator 5, in principle the hydraulic assembly 10 may also be used in a multiplicity of other applications in which firstly a coolant/lubricant flow and secondly a pressurised hydraulic fluid flow for operating a hydraulically actuated consumer are required.

The hydraulic assembly 10 has a lubricant output 16, via which hydraulic fluid can be output to the transmission 2 and/or the clutch 4 in order to lubricate components there. This is symbolised by a lubricant nozzle 18. The hydraulic assembly 10 furthermore comprises a control output 20, via which hydraulic fluid can be output to the clutch actuator 5.

A return line 21 is also provided, via which hydraulic fluid can be returned from the transmission 2 to the storage reservoir 12.

The storage reservoir 12 may here be integrated in the hydraulic assembly 10, integrated in the transmission 2, or configured as a separate component.

Figure 2:
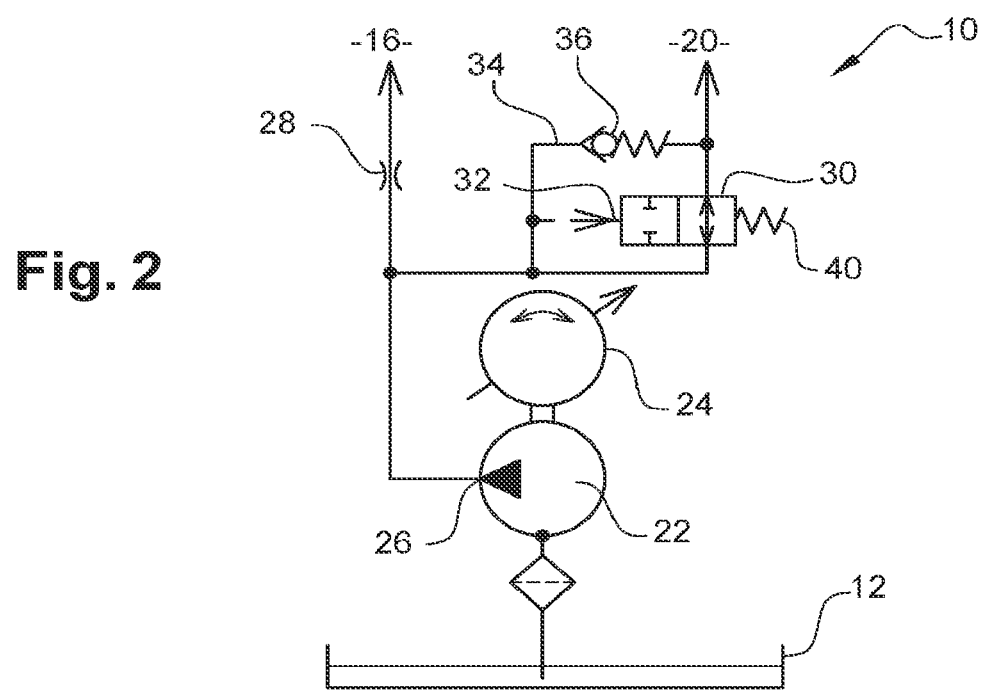
FIG. 2 shows schematically the hydraulic assembly according to the invention from FIG. 1.

The hydraulic assembly 10 (see FIG. 2) has a pump 22 which is driven by a drive motor 24. The drive motor is in particular an electric motor which can drive the pump 22 with variable rotation speed and, if required, in opposite rotation directions.

The pump 22 is a single-flow hydraulic pump. The precise structure is not relevant here.

The pump 22 has a pump output 26, which is connected to the lubricant output 16 and the control output 20.

A choke 28 is assigned to the lubricant output 16 so that a build-up pressure can be created upstream of the choke 28, depending on the delivery flow of the pump 22 and the pressure-volume demand of the hydraulically actuated consumer, i.e. here the clutch 4.

A switching valve 30, which can be switched between an open position and a blocking position, is arranged between the control output 20 of the hydraulic assembly 10 and the pump output 26 of the pump 22. The switching valve 30 is connected upstream of the choke 28, so that a build-up pressure created by the choke 28 is also present in the branch to the control output 20.

In the open position of the switching valve 30, the pump output 26 of the pump 22 is connected to the control output 20 of the hydraulic assembly 10. In the blocking position of the switching valve 30, the control output 20 is blocked so that a hydraulic fluid, conveyed to the clutch actuator 5 via the control output 20, and a hydraulic pressure generated in this branch, remain "locked in".

The switching valve 30 is switched between the open position and the blocking position, depending on the pressure in the branch between the pump output 26 and the control output 20. The corresponding switching mechanism is indicated by reference sign 32 in FIG. 2.

The switching valve 30 as a whole, and in particular the switching mechanism 32, has a structurally predefined hysteresis. A "structurally predefined hysteresis" is distinguished by a comparatively great difference, which can be set by structural measures, between an upper switching threshold and a lower switching threshold, i.e. between a threshold at which the switching valve is switched from the open position to the blocking position and a switching threshold at which the switching valve 30 is switched back from the blocking position to the open position. The structurally predefined hysteresis thus differs from the hysteresis present in every switching valve, which results in particular from friction. This unavoidable hysteresis is also present in the switching valve 30. It is however negligible with respect to its influence on the switching behaviour, in comparison with the structurally predefined hysteresis.

A bypass channel 34, in which a check valve 36 is arranged, is assigned to the switching valve 30. The check valve blocks in a flow direction from the control output 20 to the lubricant output 16.

Figure 3:
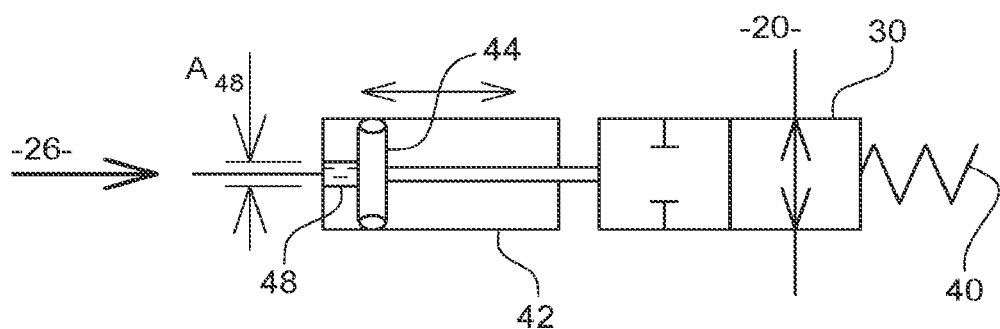
FIG. 3 shows in detail the switching valve used in the hydraulic assembly from FIG. 2, wherein said valve is in the open position.
Figure 4:
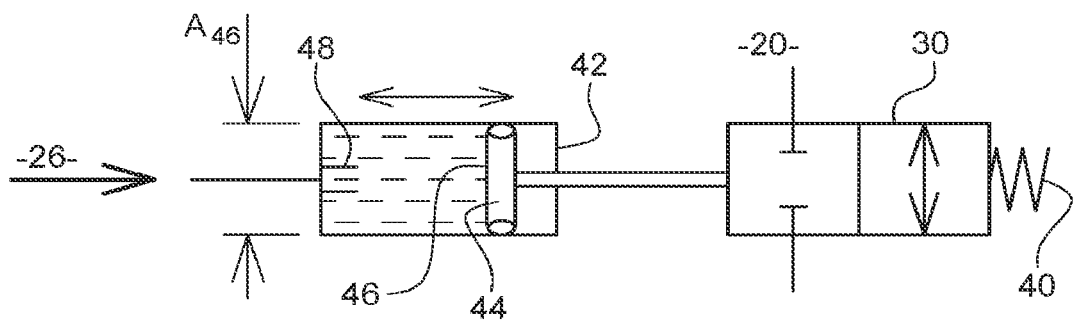
FIG. 4 shows the switching valve from FIG. 3 in the blocking position.

FIGS. 3 and 4 show an exemplary embodiment of the switching mechanism 32 for the switching valve 30.

The switching mechanism has a reset means 40, configured for example as a compression spring. It loads the switching valve 30 into the open position.

Furthermore, the switching mechanism 32 has a cylinder 42 in which an actuating piston 44 is arranged. When a working end face 46 of the actuating piston 44 is pressurised, the switching valve can be brought from the open position (see FIG. 3) into the blocking position (see FIG. 4) against the effect of the spring 40.

The cylinder 42 has a pressure connection 48, the cross-sectional area $A_{48}$ of which is significantly smaller than the cross-sectional area $A_{46}$ of the working end face 46 of the actuating piston 44. The size difference between the areas has at least a factor of 2 and preferably at least a factor of 5.

In the open position of the switching valve 30 (see FIG. 3), the working end face 46 of the actuating piston 44 lies on the pressure connection 48 and closes this. Thus only a small part of the working end face 46 of the actuating piston 44 is exposed to the pressure at the pump output 26 of the pump 22.

As soon as the working end face 46 of the actuator piston 44 lifts away from the pressure connection 48, the hydraulic fluid, still flowing into the actuating piston 44 via the pressure connection 48, acts on the entire working end face 46 of the actuating piston 44. Thus the resulting force exerted on the actuating piston 44 is significantly higher, although the active pressure is the same.

The structurally predefined switching hysteresis results from the different active cross-sections of the pressure present at the pressure connection 48 (small active cross-section $A_{48}$ when the switching valve 30 is in the closed position, large active cross-section $A_{46}$ when the switching valve is in the blocking position). When the switching valve 30 is in the blocking position, the pressure acting on the working end face 46 must fall very far below the pressure at which the switching valve is switched from the open position to the closed position.

Because of the structurally predefined hysteresis, the clutch 4 can be operated as follows:

It is assumed that the clutch 4 is open in the starting state. The pump 22 may then be operated with a starting rotation speed (e.g. 1000 rpm), wherein in this state, the conveyed hydraulic fluid is output via the lubricant output 16 to the lubricant nozzle 18. The pressure present at the pressure connection 48 is so low that the force acting on the working end face 46 via the cross-section $A_{48}$ is smaller than the preload force of the spring 40; the switching valve 30 remains in the open position. The pressure present at the clutch actuator 5 in this state, because of the open switching valve 30, is not high enough to close the clutch 4.

When the clutch is to be operated, i.e. closed, the rotation speed of the pump 22 is briefly increased, for example to 3000 rpm. Because of the build-up effect of the choke 28, the pressure in the branch to the control output 20 rises, so that the clutch actuator 5 is supplied with enough hydraulic fluid to close the clutch 4. When the clutch 4 is closed, the build-up pressure in the branch to the control 20 rises sharply. As soon as a value of e.g. 15 bar is reached, the force generated via the cross-section $A_{48}$ on the working end face 46 of the actuating piston 44 is greater than the reset effect of the spring 40, and the switching valve 30 is moved from the open position shown in FIG. 3 into the blocking position shown in FIG. 4.

The rotation speed of the pump can then be reduced again immediately. Despite the falling delivery pressure, the switching valve 30 remains in the blocking position since the lower pressure acts on the larger cross-section $A_{46}$. Although the pump 22 is now again operated with its starting rotation speed and only a low build-up pressure is present in the branch 20, the switching valve 30 remains in the blocking position, whereby the clutch 4 remains in the closed position.

If necessary, the clutch actuator 5 can still be supplied with hydraulic fluid via the bypass channel 34 even when the switching valve 30 is in the blocking position.

Because of the bypass valve 36, it is possible that on a rise in pump pressure, firstly the switching valve is switched and only then, at a higher pressure, is the clutch switched, since hydraulic fluid is supplied via the bypass valve and not via the switching valve.

When the clutch 4 is to be opened again, it must be ensured that the pressure in the cylinder 42 falls far enough for the effect of the spring 40 to exceed the force exerted on the actuating piston 44 from the pressure acting on the working end face 46. The active pressure may be reduced either by lowering the rotation speed of the pump 22 enough for the build-up pressure upstream of the choke 28 to fall sufficiently far, or by briefly reversing the rotation direction of the pump so that a suction effect is created on the side of the pump output 26. Thus the switching valve 30 returns to the open position (see FIG. 3), and the clutch actuator 5 is evacuated towards the transmission via the control output 20, the open switching valve 30 and the lubricant output 16.

Then the pump 22 can again be operated with the starting rotation speed, so that hydraulic fluid is supplied to the transmission for the purpose of lubrication. The brief reduction or interruption in the lubricant supply, at the time at which the clutch is to be opened, has no harmful effect on the lubrication as a whole. Nor is the brief increase in current/lubricant flow, on actuation of the clutch at a motor rotation speed of e.g. 3000 rpm, disadvantageous.

Figure 5:
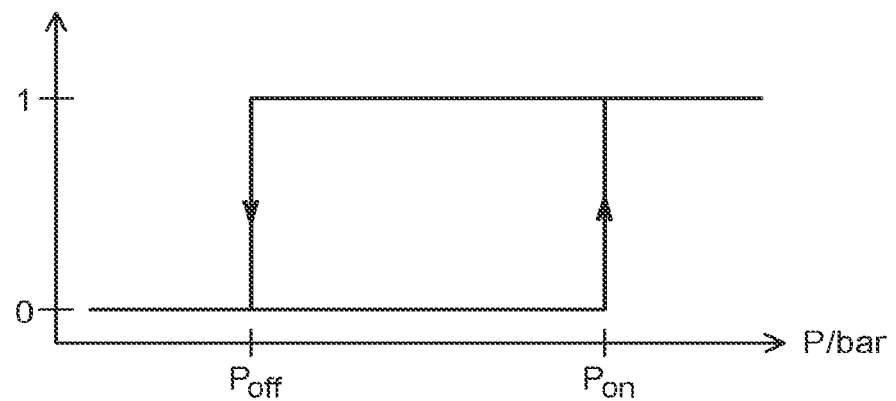
FIG. 5 shows a schematic diagram of the hysteresis of the switching valve.

The structurally predefined hysteresis of the switching valve 30 is shown in FIG. 5.

The pressure is shown on the X axis, wherein $P_{on}$ indicates the pressure for a transition from the open position to the blocking position, and $P_{off}$ indicates the pressure for a transition from the blocking position to the open position.

On the Y axis, "1" indicates the blocking position and "0" indicates the open position.

The gap between the upper switching threshold ("$P_{on}$") and the lower switching threshold ("$P_{off}$") allows the pump to be operated in a "normal state" in which it provides only a coolant/lubricant flow. This state is present before and after operation of the clutch actuator.

Figure 6:
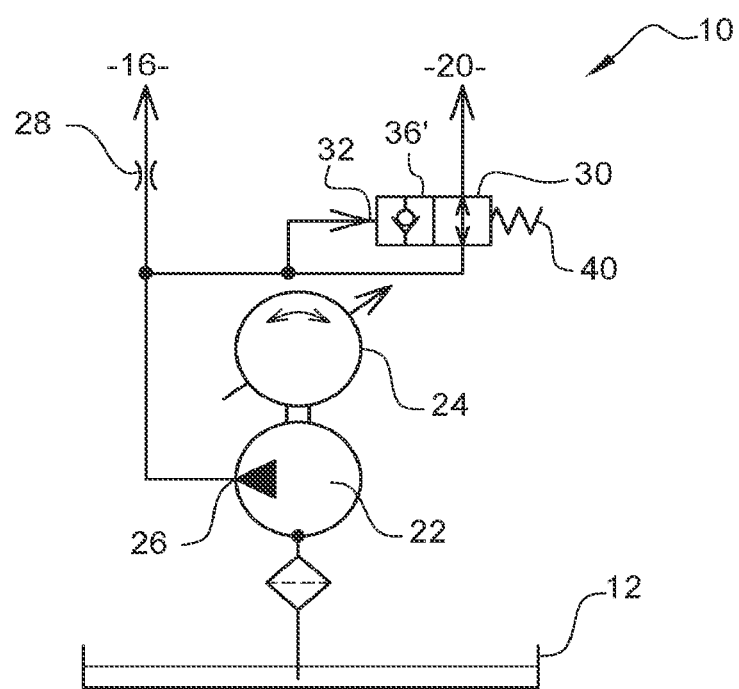
FIG. 6 shows schematically a hydraulic assembly according to a second embodiment.

FIG. 6 shows a hydraulic assembly according to a second embodiment. The same reference signs are used for the components and features known from the first embodiment, and to this extent, reference is made to the explanations above.

The difference between the second and first embodiments is that in the second embodiment, the check valve is not arranged in a bypass channel but is integrated in the switching valve 30. In the open position, the hydraulic fluid can pass unhindered, as in the first embodiment. In the blocking position of the switching valve 30, the hydraulic fluid can still be conveyed directly through the check valve 36' in the switching valve.

Figure 7:
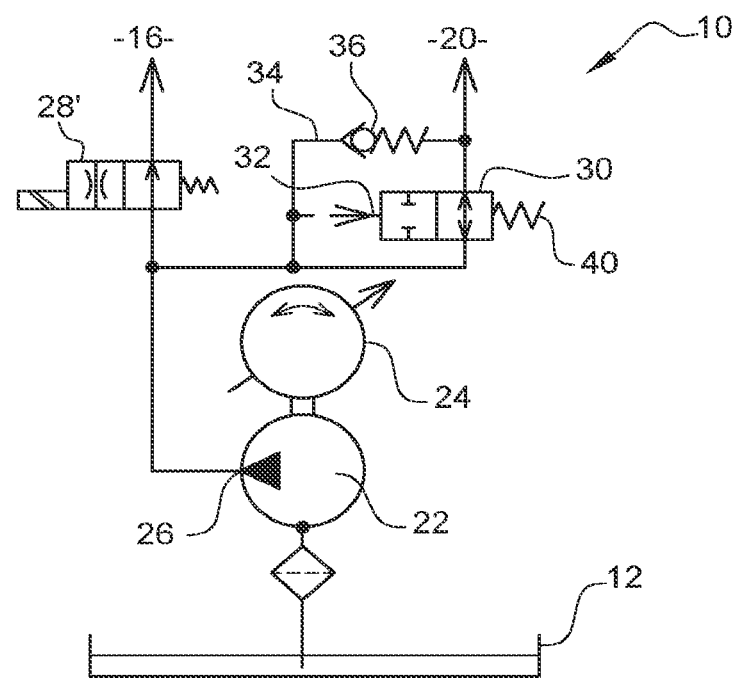
FIG. 7 shows schematically a hydraulic assembly according to a third embodiment.

FIG. 7 shows a hydraulic assembly according to a third embodiment. The same reference signs are used for the components and features known from the preceding embodiments, and to this extent, reference is made to the explanations above.

The difference between the third and the preceding embodiments is that in the third embodiment, instead of the choke, a choke valve 28' is provided which allows switching between a position with free flow and a position with choked flow. In this way, the energy consumption can be lowered further when the control valve 30 is not switched, i.e. when no build-up pressure is required at the output 26.

Figure 8:
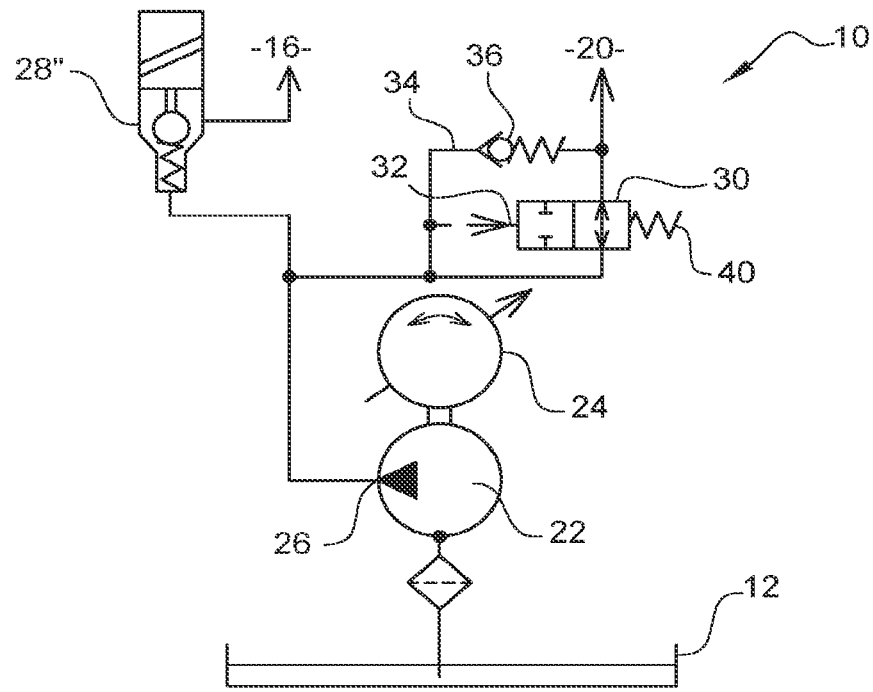
FIG. 8 shows schematically a hydraulic assembly according to a fourth embodiment.

FIG. 8 shows a hydraulic assembly according to a fourth embodiment. The same reference signs are used for the components and features known from the preceding embodiments, and to this extent, reference is made to the explanations above.

The difference between the fourth and the third embodiments is that in the fourth embodiment, a proportional valve 28" is provided with which a build-up pressure can be generated when required.

The advantage of the proportional valve 28" is that it can be completely closed for a short time. This the clutch actuator 5 is filled with hydraulic fluid even more quickly, so as to give a particularly short reaction time.

Then the proportional valve may be set so that a specific build-up pressure is maintained and the switching valve 30 remains closed. At the same time, the coolant/lubricant flow 16 can be set very variably by the combination of the rotation speed of the motor 24 and the energising of the proportional valve 28" (from virtually no coolant/lubricant flow to very high coolant/lubricant flow) with the switching valve 30 closed at the same time, since the build-up pressure for the switching valve 30 can be maintained.

The invention claimed is:

1. A hydraulic assembly comprising:
    a lubricant output;
    a control output;
    a pump which can supply a hydraulic fluid flow to the lubricant output and the control output; and
    wherein a switching valve with structurally predefined hysteresis is arranged between a pump output and the control output of the hydraulic assembly and, depending on a pressure in a branch between the pump output and the control output, can be switched between an open position in which the control output is connected to the pump output, and a blocking position in which the control output is blocked off,
    wherein the switching valve switches from the open position to the blocking position when the pressure provided by the pump exceeds an upper switching threshold, and returns from the blocking position to the open position when the pressure provided by the pump falls below a lower switching threshold, the lower switching threshold being smaller than the upper switching threshold by at least a factor of 2.

2. The hydraulic assembly according to claim 1, wherein the switching valve has an actuating element which is exposed to the pressure in the branch between the pump output and the control output.

3. The hydraulic assembly according to claim 2, wherein the actuating element is an actuating piston which is arranged in a cylinder having a pressure connection which is connected to the branch between the pump output and the control output, and a working end face of the actuating piston rests on the pressure connection and closes the pressure connection when the switching valve is in the open position, wherein a cross-sectional area of the pressure connection is smaller than a area of the working end face.

4. The hydraulic assembly according to claim 2, wherein the switching valve is loaded into the open position by a reset element.

5. The hydraulic assembly according to claim 4, wherein the reset element is a spring, a permanent magnet, a mass part exposed to the effect of gravity, or a pneumatic element.

6. The hydraulic assembly according to claim 2, wherein a bypass channel is provided which connects the pump output to the control output, bypassing the switching valve, wherein a check valve is provided in the bypass channel which blocks a return flow from the control output to the pump output.

7. The hydraulic assembly according to claim 2, wherein a bypass valve is integrated in the switching valve.

8. The hydraulic assembly according to claim 2, wherein a choke is arranged downstream of a branch to the switching valve between the pump output and the lubricant output.

9. The hydraulic assembly according to claim 1, wherein the switching valve is loaded into the open position by a reset element.

10. The hydraulic assembly according to claim 9, wherein the reset element is a spring, a permanent magnet, a mass part exposed to the effect of gravity, or a pneumatic element.

11. The hydraulic assembly according to claim 1, wherein a bypass channel is provided which connects the pump output to the control output, bypassing the switching valve, wherein a check valve is provided in the bypass channel which blocks a return flow from the control output to the pump output.

12. The hydraulic assembly according to claim 1, wherein a bypass valve is integrated in the switching valve.

13. The hydraulic assembly according to claim 1, wherein a choke is arranged downstream of a branch to the switching valve between the pump output and the lubricant output.

14. The hydraulic assembly according to claim 1, wherein a choke valve, which can be switched between a position with free flow and a position with choked flow, is arranged downstream of a branch to the switching valve between the pump output and the lubricant output.

15. A hydraulically actuated consumer which generates a counterforce during operation comprising:
   a hydraulic assembly according to claim 1,
   an actuator which is coupled to the control output of the hydraulic assembly, and
   a reset device which loads the consumer into one position and counteracts the actuator.

16. The consumer according to claim 15, wherein a pressure at which the actuator is switched against an effect of the reset device, lies below the upper switching threshold.

17. The consumer according to claim 15, wherein a check valve is provided in a bypass and the consumer is actuated via the bypass.

18. A method for switching a consumer according to claim 15, wherein the actuator is supplied with hydraulic fluid via the control output in order to switch the consumer from one state into another, wherein the switching valve is loaded into the open position by a reset means,
   wherein the pump is operated with a starting rotation speed at which the pressure lies below the upper switching threshold, and the conveyed hydraulic fluid is output via the lubricant output;
   wherein the rotation speed of the pump is increased if the consumer is to be switched, so that firstly the actuator is supplied with hydraulic fluid and, as soon as the consumer has been operated, hydraulic fluid builds up in the branch of the control output until the upper switching threshold is exceeded, whereby the switching valve is brought into the blocking state;
   wherein then the rotation speed of the pump is lowered again to the starting rotation speed, wherein the switching valve remains in the blocking state because of the structurally predefined hysteresis;
   wherein finally, when the consumer is to be switched back, the rotation speed of the pump is lowered or reversed so that it falls below the lower switching threshold and the switching valve returns to the open position.

19. The method according to claim 18, wherein when the switching valve is closed, the rotation speed of the pump is increased in order to still convey hydraulic fluid to the actuator via a bypass valve.

20. The consumer according to claim 15, wherein the consumer is a clutch.

* * * * *